April 2, 1963  M. J. McINTYRE  3,083,839
CABLE LOGGING OPERATION
Filed March 30, 1961  6 Sheets-Sheet 1

INVENTOR.
MAURICE J. McINTYRE
BY
Robinson & Berry
ATTORNEYS

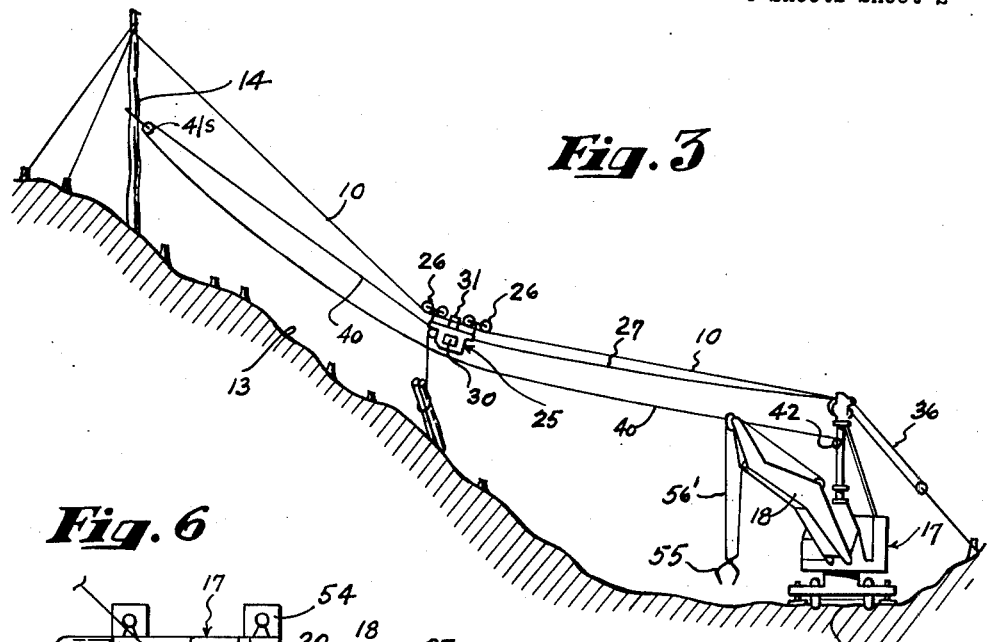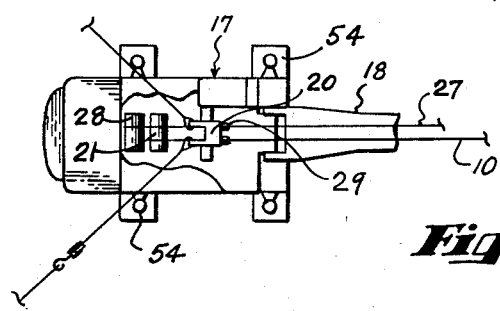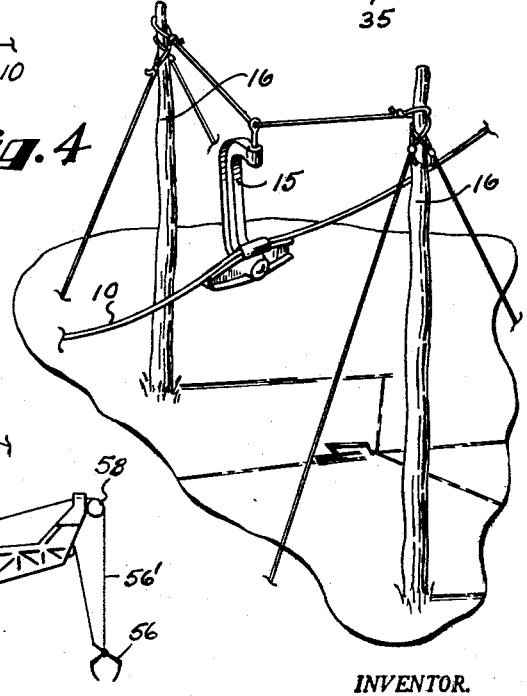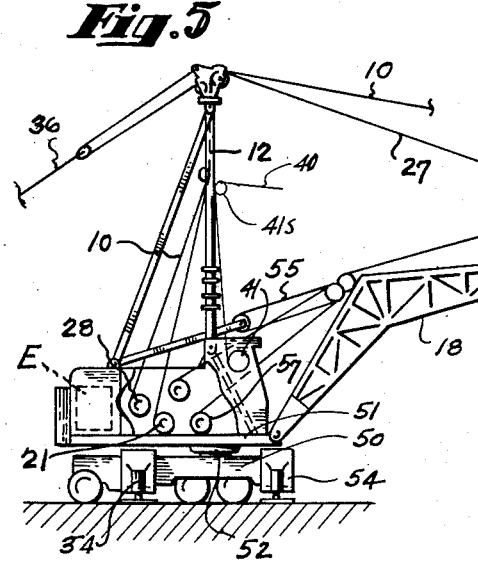

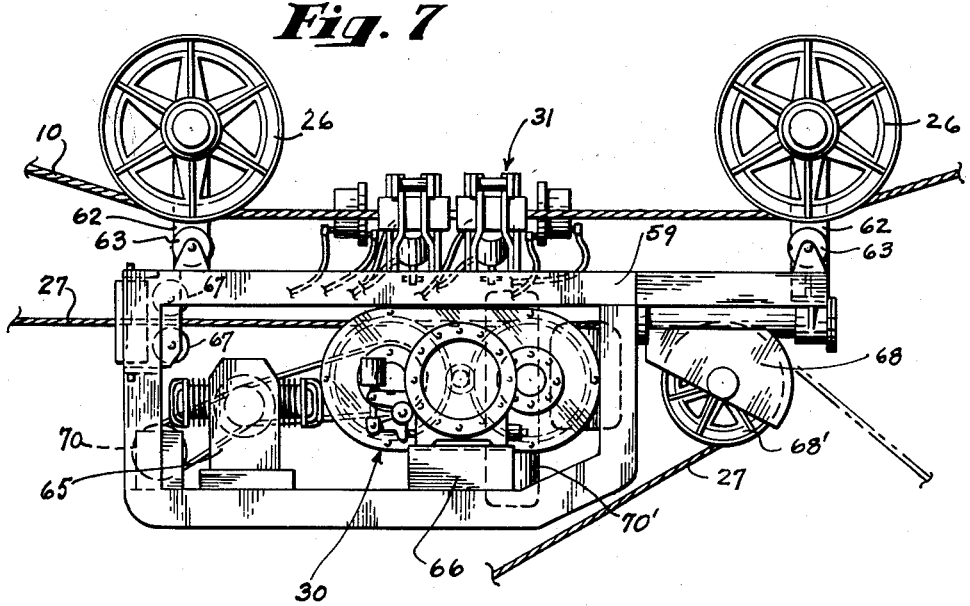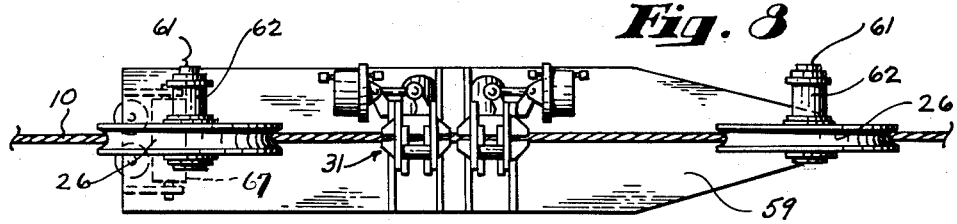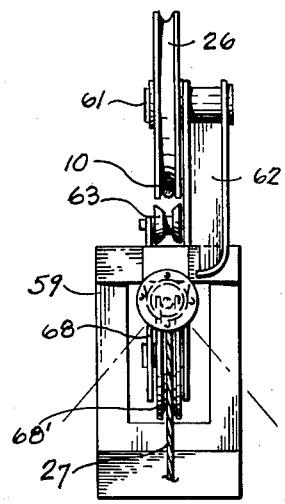

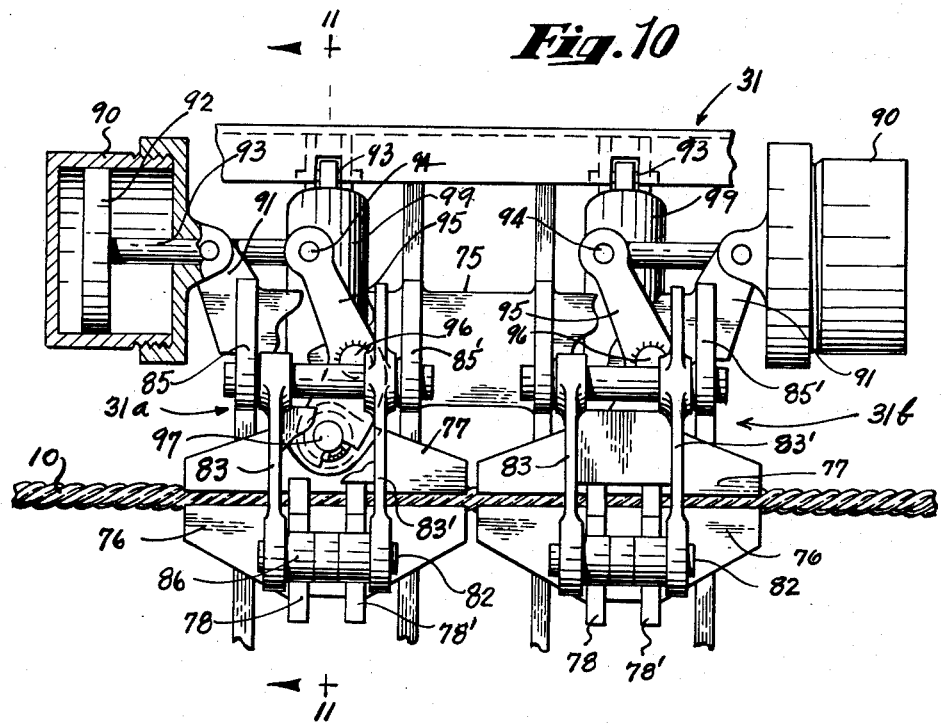
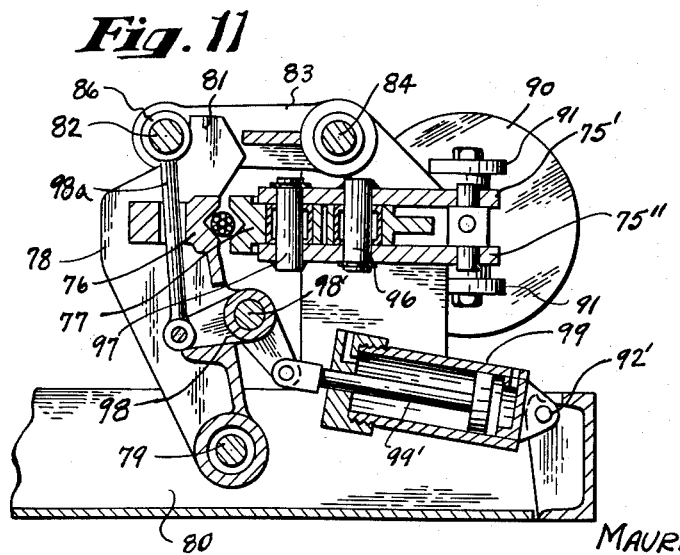

INVENTOR.
MAURICE J. McINTYRE
BY Robinson & Berry
ATTORNEYS

April 2, 1963    M. J. McINTYRE    3,083,839
CABLE LOGGING OPERATION
Filed March 30, 1961    6 Sheets-Sheet 6

INVENTOR.
MAURICE J. McINTYRE
BY
Robinson + Berry
ATTORNEYS 3,083,839
CABLE LOGGING OPERATION
Maurice J. McIntyre, Sedro Woolley, Wash., assignor to The Humboldt Company, Seattle, Wash., a corporation of Washington
Filed Mar. 30, 1961, Ser. No. 113,574
7 Claims. (Cl. 212—87)

This invention relates to logging operations. More particularly, it relates to an improved system of aerial cable logging that is especially designed for the conveyance of logs from the steep slopes of hills and valleys such as, for example, those of the hilly and mountainous regions of the States of the Pacific Northwest of the United States of America and in other locations having similar forested terrain.

It is the principal object of this invention to provide an improved system of "cable logging" that is economical, practical, and otherwise feasible for present day use in such areas as above indicated, for both selective and clear cut logging in uphill, downhill or level logging operations.

It is another object of this invention to provide a novel skyline cable system of logging that is speedy and expeditious within certain predetermined limits and which can be effectively and efficiently operated by fewer laborers than ordinarily required for comparable operations; that permits use of fewer and lighter weight cables and associated equipment than is normally employed in similar logging operations and which can be profitably employed for the logging of areas where logging normally could only be carried on at a much higher cost.

It is a further object of this invention to provide a skyline system of cable logging that, in its present embodiment, is characterized by the use of a mobile log loader equipped with a portable spar for support of the skyline cable; with a grapple boom for the loading of yarded logs and with all the cable spooling drums and power devices normally required for the operation. Furthermore, to incorporate in this system a "sky car" or carriage of novel design for travel along the skyline cable under control of a single snubbing or haul-back line that is adapted to be spooled onto or from an "in-haul" drum mounted on the mobile loader, and which snubbing line serves the dual purpose of the means for dragging in the log loads from the defined logging area to the sky car or carriage and for holding them when lifted to proper suspension therefrom, for conveyance by travel of the car to the yarding area or landing, either by its pulling of the car uphill along the skyline in "uphill" logging or by controlling its downward travel along the skyline in "down hill logging."

It is a further object of this invention to provide the present skycar or carriage with a new and novel form of skyline cable engaging clamp with radio operable controls whereby the car may be secured against travel at any point along the skyline thus to permit that paying out of the snubbing line from the skycar that is required for the making of side haul connections and for then pulling in and suspending of the log load from the skycar for movement to the landing area, and for holding the skycar from travel during lowering of the log load for the pick up of logs by the grapple of the loader boom for loading them onto trucks or cars.

Yet another object of the present invention resides in the provision of a logging system of the above stated character, employing a single snubbing line that is used both for those side haul operations that bring cut logs to the skycar, and also for effecting car travel along the skyline. Furthermore, to equip the skycar with a radio controlled slack puller of novel kind operable for the drawing of slack in the snubbing line in order to pay it out from the skycar to the extent required for making a side haul connection with a log load and may then, after the load has been drawn in by the snubbing line to the skycar and lifted for transportation may be set to hold the slack puller and thus, through it, to provide a secure non-slip connection between skycar and snubbing line for the inhauling of the log load along the skyline to the landing.

Further objects and advantages of the invention reside in the provision, in association with the slack puller and skyline cable engaging clamp of means for their radio control, as may be required for control of their particular functional operations.

Further objects and advantages of the invention reside in the combination of parts embodied in the present cable logging system; in the novel features of the various parts of the combination and in the mode of operation of the system, as will hereinafter be fully described.

In accomplishing the above mentioned and other objects of the invention, I have provided the improved details of construction of the preferred forms of which are illustrated in the accompanying drawings, wherein:

FIG. 3 is a view similar to that of FIG. 1 showing the present system as installed for a downhill logging operation.

FIG. 4 is a view showing the skyline employed in the present system as supported between its ends by a hanger suspended between laterally spaced spars.

FIG. 5 is a side view of the mobile loader as presently being employed in this system showing it as equipped with a portable spar.

FIG. 6 is a top view of the loader as shown in FIG. 5.

FIG. 7 is a side view of the "skycar" featured in the present system as mounted for travel on a skyline.

FIG. 8 is a top, or plan, view of the skycar as shown in FIG. 7.

FIG. 9 is an end elevation of the skycar.

FIG. 10 is a plan view of the skyline cable clamp as applied to the top of the skycar frame or housing.

FIG. 11 is a cross-section, taken through the cable clamp on line 11—11 in FIG. 10.

Figure 1:
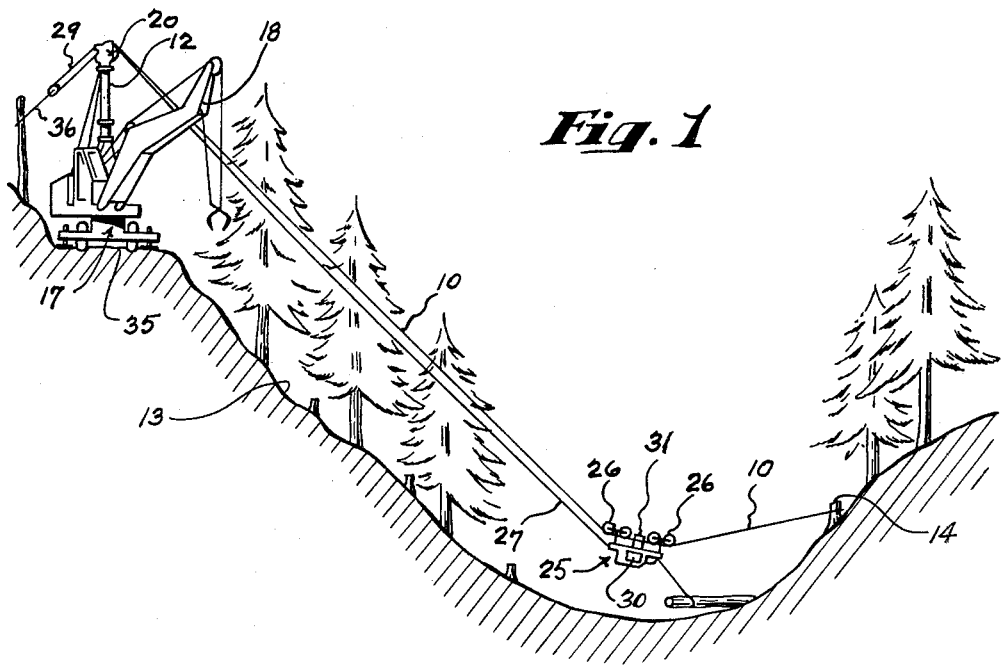
FIG. 1 is a schematic illustration of a logging system embodied by the present invention, as installed for an uphill logging operation.

For a proper evaluation of the subject matter of the present invention, it is well first to give consideration to logging methods and systems as presently employed. For instance, visualize a well timbered slope that originates in a valley and continues up to the crest of the slope; the ground of this slope generally being rocky, broken and at a grade of up to 90%.

There are two present day systems by which such terrain might be logged. The first of these which is now generally considered to be obsolete, is known as the "skidder system." This involves the use of a "skyline" that may be drawn up the slope to as much as 2000 feet. The skyline mounts a carriage for travel thereon and power is supplied through cables from a power source, such as a donkey engine at the base of the slope. This particular skidder system requires many cables reaching from the power source, up the slope to the carriage; one cable being employed to pull the carriage uphill along the skyline; another being required to pull the carriage back down the slope with its turn of logs and still another cable to pull slack in the cable used to yard the logs to the carriage. This skidder system is very expensive to rig and operate and it is limited generally by its inability to reach to the crest of the generally encountered slopes.

The second of these known present day systems is known as "high leading." This system utilizes a spar tree that is rigged with cable and the logs are dragged up or down the slope to the spar tree. In utilizing this high leading system, the yarding distance is limited to about 1000 feet. If the slope extends beyond that distance, as for example, up to a mile, then a series of roads must be built in so that the slope becomes accessible to men and machines over its entire area. Because of the usual rocky and rough condition of such slopes, road building is exceedingly costly, especially in consideration of the volume of timber available or profitable to harvest. This system generally is uneconomical and impractical to employ.

The system of the present invention employs a skyline which extends from top to bottom of the slope and which mounts a radio controlled carriage for travel thereon to its full length. The distance to which the skyline may be extended is limited only by the economics of the rigging cost in comparison to the volume of timber available under and adjacent the skyline. Utilizing this system, it is possible to suspend the skyline from top to bottom of the mountain or slope covering a mile or more in length thereby providing a transportation means for the yarding and carrying of the logs up or down the slope, at a minimum of cost. The merit of the radio controlled carriage, herein to be described, purely as a means of transporting logs resides in its ability to move logs along the mountain slope at a speed of up to 25 miles per hour, which compares favorably with truck speeds on mountain roads. The system includes a snubber cable that has connection with the carriage for controlling its travel and for side haul yarding.

The present use of the skyline provides the most direct route from top to base of the mountain slope, with a minimum of expense, and with the skyline logging road established, it is possible to reach out a distance of approximately 200 feet at either side thereof and yard logs to the carriage, there to lift them free of the ground, ready for transportation up or down the slope. Because the logs are suspended, damage to logs is minimized and soil conditions are undisturbed.

Before giving a detailed description of the present invention, it will be explained that various cable systems for logging have been extensively employed in the Pacific Northwest for approximately sixty years and it is not the intent to claim herein anything new in the use of a skyline cable haul back or snubber line except as elements of the combination of devices presently to be described.

In a previous application for patent, filed by M. J. McIntyre, under Serial Number 788,938, filed Jan. 26, 1959, and now Pat. No. 3,022,747, aerial downhill logging by means including a carriage or "skycar" that is mounted for travel on a "skyline," under radio control, has been illustrated and described. In the system of that pending application, the loaded carriage traveled downhill on the skyline under its own weight and that of the log load. When unloaded at the lower end of a haul, it was pulled back up hill by a haul back cable extended thereto from a donkey engine at the high end of the line. Also, in the device of this pending application, an engine operating under radio control was contained within the skycar or carriage controlling a cable winding drum from which a cable was dropped and drawn out for the side haul pulling in of logs thereto from the logging area and for lifting them off the ground preparatory to their conveyance by travel of the car along the skyline, to a landing.

In the present instance, the carriage hereinafter designated as the skycar, has been substantially reduced both in size and in weight by reason of the elimination therefrom of the large, heavy diesel engine, cable winding drum and their necessary accessories. Furthermore, the present system employs a single haul back or snubbing line that extends to the skycar from a drum on the loader, and is extendable laterally from the skycar for making all side haul connections and for drawing in the log loads to the car and for lifting the loads as required for transportation. This reduction in weight of the skycar permits lighter weight cable to be used for skyline and snubber with an incident material reduction in operation costs.

Aside from the elimination from the skycar of the large heavy engine and cable winding drum as previously employed for spooling in of the side haul cable, its engine and radio controls, the present system further differs also in that the snubber or haul back line herein employed is fixedly joined to the skycar as required for its movement on the skyline, through the mediacy of that novel slack puller mechanism mounted in the skycar as previously mentioned and operable to draw slack in the snubbing line and to pay out this slack from the skycar to any extent desired or required for the making of side haul connections and after dragging in the side haul log load to the car and lifting it for transportation, this slack puller may be set by braking to hold the snubbing line as required to support the lifted log load properly in suspension while being moved to the landing and loading area by the inwinding of the snubbing line on its drum as mounted on the loader.

The utility of the present system is dependent to great extent upon the operative manipulations of the previously mentioned skyline cable clamp and the holding brake as employed is connection with the slack puller; these being operable under radio control, as will presently be described in detail.

The combination herein shown comprises the properly supported skyline; the skycar or carriage that is operable along the skyline; a log loader equipped with grapple boom and all necessary spooling drums for the cables necessarily used in the system; and a snubbing line extended from loader to skycar; the skycar being necessarily equipped with the skyline engaging clamp to hold it against travel on the skyline when such is desired and the slack puller being equipped with its holding brake for effecting a holding connection with the snubbing line when necessary. The system also includes the necessary radio controls for the manipulation of the cable clamp and the slack puller brake by a ground worker.

While it is believed that there is novelty in the slack puller mechanism and also in the skyline cable clamp, per se, it it is also believed that the system as a whole is novel and it is not desired that its claims shall be limited by the inclusion therein of structural limitations of the various elements. For example, any suitable skyline cable clamp might be employed on the skycar and suitable slack puller mechanism might be employed. However, since these various elements of the combination are believed to individually contain novel features, they will be claimed along with the claims based on the combination of elements which make up the combination.

Referring now to FIG. 1; this view schematically illustrated an up hill logging operation wherein 10 designates a "skyline" cable that extends from the top of a guyed spar 12, downwardly along a downhill slope 13 and is anchored at its lower end to a fixed object, such as the well rooted stump 14. This skyline cable 10 is supported under sufficient tension that in its use it will maintain a desired and required elevation above ground. In some instances of its present use, the skyline 10 may be supported, at suitable intervals therealong by shoes or jacks 15 suspended from spars 16, as has been illustrated in FIG. 4.

In this system, the spar 12 may be the usual, suitably guyed spar tree apart from the mobile loader or, as in the present instance, it may be a present day type of portable spar mounted upon the bed of a mobile log loader 17 that carries a log loading boom 18 thereon. The spar 12, as here mounted on the bed frame of the loader 17, is guyed for support in the conventional manner and it is equipped at its top end with a suitable swiveled fairleader 20, preferably of that kind shown in U.S. Patent No. 2,883,068 and the skyline 10 is extended upwardly from the cable winding drum 21 on the yarder, over the fairleader 20 thence downhill over the jacks when used, to the anchoring stump 14. The drum 21 may be used to adjust and retain the tension of the skyline after it has been secured and in this way, establish its working height above ground.

Mounted on and for travel along the skyline 10 is the present carriage 25, herein designated also as the "skycar"; the skycar being suspended at its opposite ends from wheeled carriages 26—26 which travel on the skyline 10. A haul back or snubber cable 27 is wound on a drum 28 mounted on the loader platform, and extends therefrom upwardly along the spar 12, over a sheave 29 at its top end, thence along the skyline 10 to the skycar 25 where it has a releasable and adjustable holding connection therewith, as provided for through the novel slack puller mechanism previously mentioned and which is designated generally in FIGS. 1 and 7 by numeral 30; this connection providing for uphill pulling of the car with or without a suspended log load and for its controlled downhill travel, the slack puller being operable, as presently explained, to pay out the inhaul or snubbing cable 27 from the skycar as required to enable a "hooker" working on the ground to make a side haul choker connection with a log load.

It is also a feature of this invention, where the inhaul or snubbing line 27 is to be used for making side haul log load connections, that the skycar 25 is equipped with a skyline cable clamp, designated in its entirety in FIGS. 1 and 7 by numeral 31, that may be set against the skyline 10 to hold the skycar against any travel while the slack puller is operating to pay out the snubber line or while a side haul load is being pulled in to the carriage. Likewise, to hold it against travel while lowering a load from the skycar at the landing area.

In the present system as now designed and used, the sky line 10 provides an efficient yarding distance up to approximately 2500 feet and side hauls along the skyline may be made up to 200 feet each side thereof. The skycar is as presently used, designed for carrying up to a 10-ton load.

The logging tower or spar 12 is shown in FIG. 1 as being mounted on the bed of the mobile loader and to extend to a height of between 50 and 75 feet. The loader is here shown to be equipped with wheels and laterally extendable outriggers, stabilizing jacks designated at 34 and on its platform it mounts the required number of cable winding drums for the various cables individually employed in the operation. A suitable engine E (FIG. 5) is mounted on the loader for its propulsion and for driving the drums. This may be any of the conventional form of yarder engines.

Figure 2:
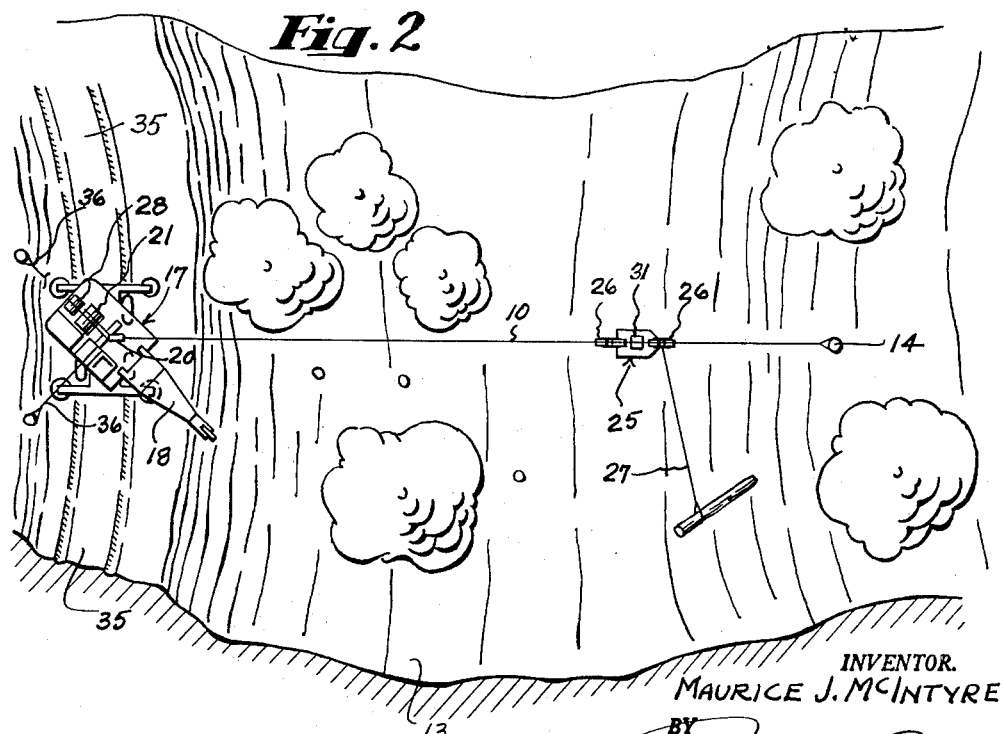
FIG. 2 is a plan view of the system as shown in FIG. 1.

Assuming that the system is to be set up for an uphill logging operation as shown in FIGS. 1 and 2, the installation would generally be preceded by the building of a suitable truck roadway, as at 35, extending along the upper limits of the area to be logged. The mobile loader 17 would then be moved into suitable position, the spar 12 erected and guyed as by the guy lines designated at 36 in FIG. 2 and the outriggers extended. The skyline 10 is then drawn up and passed through the swivel sheave 20 and drawn out in the usual manner, by the usual means, and suitably anchored at its outer end, as for example, to the stump 14. It is then placed under required tension by winding in or from drum 21 and the skycar 25 placed thereon, with snubbing line 27 attached thereto through the mediacy of the braked slack puller mechanism 30 mounted in the skycar which presently will be fully explained. The snubber cable may then be payed out to permit the skycar 25 to move by gravity down the skyline 10 under control of the drum 28 on which the snubber line is wound, to the desired point and it is there held against farther travel by setting the normally released holding clamp 31 on the skycar against the skyline cable 10. Then the brake of the slack puller 30 is released and the drums of the slack puller energized, to pay out the snubbing line 27 therefrom and permit it to be drawn out by the hooker, working on the ground, for its connection with the log load to be conveyed or dragged in. After the log load connection has been made, the snubbing line 27 is then wound in on the drum 28 on the loader from which it is extended thus to pull the log load to a position below the car and to lift it from the ground to a required extent, but usually allowing their lower ends to drag; this being desirable, but is not always possible, first to lessen the weight of the load to be moved and second to prevent any shock loading of the skyline if the logs hit the ground while traveling. With the log load lifted, the slack puller brake is set and the cable clamp released for hauling in the load to the landing. With the load moved to the landing, the holding clamp 31 is again set. Then the slack puller brake is released and the load is lowered by snubber line 27 to the ground and the logs picked up by the loader grapple if this is desired.

When the system is used in a downhill logging operation, the roadway 35 will be located along the lower boundary of the area to be logged off and the anchor stump will be at the higher limit of the area, as shown in FIG. 3. In this operation, the arrangement of parts is such that the skycar 25 must be pulled uphill. This may be done by use of the usual straw line cable 40 which is spooled on a straw line drum 41 with which the loader is equipped. The straw line extends from the drum 41 to the high end of the area and about a sheave at the anchored end of the skyline and then back to the outer or higher end of the skycar and securely fixed thereto. The inhauling of logs to the car 25 from the logging area is accomplished by means of the inhaul or snubbing cable 27 applied thereto and used in the same manner as previously explained.

The same mode of operation applies for use of the present system in level logging as for down hill logging. Each of the operations as employed for uphill, downhill or level logging utilizes the skyline cable; the mobile loader or donkey engine; the skycar 25 as equipped with cable clamp 31; the slack puller 30 with holding brake; the snubbing line 27 and the radio controls for operation of the clamp 31 brake and slack puller engine. Each of these various devices has new and novel parts which will now be described more in detail; the first being the loader 17 which has been illustrated in FIGS. 5 and 6.

The loader employed for use in this system preferably is of the general character of that of my U.S. Patent No. 2,745,559 although not confined thereto. It is here shown best in FIG. 5 to comprise a wheel equipped chassis or base frame 50 on which an upper structure 51 is supported by a turntable mounting 52. This upper structure mounts the log heeling boom 18; a portable spar tower 12 and the usual cable winding drums in connection with the engine E. It is also shown that the base frame 50 of the loader is equipped at opposite sides with outrigger jacks 54 such as those of U.S. Patent No. 2,855,111 for support and stabilization of the loader in use.

It is understood that the boom 18 will be raised and lowered by the necessary cable connection as here designated by numeral 55 and the boom will be equipped at its outer end with a suitable grapple 56 operatively suspended by a cable 56' extending from the cable winding drum 57 along the boom and downwardly from a fairleader 58 at its outer end.

It is anticipated also that the loader 17 shall be moved from location to location by power from its engine E. It is to be understood that where it is not practical or possible to employ the loader 17 as here shown, the usual donkey engine, with the usual cable winding drums and controls may be used. In such use, the spar 12 employed in lieu of that here shown, might well be the usual spar tree or an independently portable spar. This would necessitate log loading for transportation by means other than the loading boom 17 here shown. In the event of the use of the usual donkey engine, it would be equipped with cable drums corresponding to the previously mentioned drums 21, 28 and others later to be mentioned herein.

The skycar 25 as shown in side view in FIG. 7 comprises an enclosing frame and cab structure 59 of exceptionally sturdy construction and of an elongated box-like character, and equipped at its opposite ends with rigidly attached hangers 62 mounting wheels 26—26 on horizontal stub axles 61 for travel of the wheels in tandem on the skyline 10, as illustrated in FIGS. 7, 8 and 9 wherein it is also shown that small diameter rollers 63 are mounted by the hanger brackets to coact with the cable 10 to retain the wheels 26—26 from any possible jumping, in travel, from the cable.

Contained within the cab frame structure 59 at a medial location, is the slack puller mechanism which has previously been designated in its entirety by reference numeral 30. Located between the slack puller mechanism and the left hand end of the frame structure as seen in FIG. 7, is a gas powered engine 65 for effecting slack puller operation, as presently explained and located at the opposite end of the frame, is a storage tank 66 containing liquid fuel for engine 65.

Mounted at that end of the frame structure 59 which is the left hand end of the cab as shown in FIG. 7, are fairleader rolls 67—67 between which the snubbing line 27 leads to the slack puller 30 and at the opposite end of the frame, a sheave wheel block 68 mounting a sheave wheel 68' is supported for lateral swinging to opposite sides of the central vertical plane of the frame. The snubbing line 27 leads from the slack puller over the sheave wheel 68' and may be drawn out from the skycar for making side haul connections.

It is further shown in FIG. 7 that a small air compressor 70 is mounted at the left hand side of the engine, for a purpose presently to be explained. It will here be further explained that the slack puller 30 is operable providing that the skycar has been secured against travel along the skyline 10 by the cable clamp 31 presently to be described, to draw out the snubbing line 27 from the winding drum 28 on the loader 17 and pay it out from the skycar over the sheave wheel 68' to the necessary extent for making any side haul load connection. In the present instance, this extending for side haul is practical up to approximately 200 feet each side of the skyline. The slack puller drums are permitted to run free, as later explained, under inward pull of the snubber cable by the drum 28 for lifting the load for conveyance to the skycar. Then, by braking the slack puller drums against turning by means presently explained, the load may be held in suspension as the skycar is moved up to the skyline to convey its load to the loader 17.

Proper functioning of the slack puller 30 in its cable pulling and holding operations is dependent, as previously explained, on the provision of a means for holding the skycar against travel along the skyline 10 while a load is being pulled in to the car from the logging area; while the load is being lifted to the car and while being unloaded. This holding of the skycar is accomplished in the present system by the cable clamp which is designated herein in its entirety by numeral 31. This clamp will now be described, reference being directed particularly to FIGS. 9 and 10.

It is to be observed in FIGS. 10 and 11 that the cable clamping means 31 comprises two similarly formed clamping units 31a and 31b, mounted in side by side relationship on top of the skycar, and supported in part by a horizontally disposed frame 75 comprising vertically spaced plates 75'—75" fixedly mounted upon the top framework of the skycar 25. Each clamping unit comprises a pair of coacting jaws, 76 and 77, arranged at opposite sides of the cable 10 to open from and to close against it to permit or to prevent travel of the car along the cable. It is shown in these views that the outside jaw 76 of each unit is formed integrally with a pair of spaced, vertically positioned supporting levers 78—78' which are pivotally supported at their lower ends on a horizontal shaft 79 extended parallel with cable 10 between and supported by top members 80 of the skycar frame as in FIG. 11. At their upper ends the levers 78—78' extend above the jaw 76 and terminate in upwardly projecting shoulders 81—81 which are designed to serve a purpose presently explained in connection with the clamp releasing operation.

The inside jaw 77 of the unit faces jaw 76 with the skyline cable 10 passing between them. These jaws have their inside surfaces channeled to seat the cable, as seen in FIG. 11. The holding position of jaws 76 is normally retained, as in FIG. 11 by a cross-shaft 82 that extends between the outer ends of a pair of lever arms 83—83' with inner ends fixed on a supporting shaft 84 extended between and rotatably supported by flanges 85—85' welded to the top surface of plate 75. Cross-shaft 82 has collars 86 fitted thereto which engage the shoulders 81 of levers 78 to retain the position of jaw 76, as in FIG. 11, for cable clamping.

Associated with the clamp jaw 77 of each unit is an air cylinder 90 that is pivotally and fixedly mounted by a pair of brackets 91 extended from the corresponding end of frame 75. Each cylinder reciprocally contains a piston 92 with its piston rod 93 extended therefrom and pivoted at its outer end, as at 94 in FIG. 10, to one arm of a bell crank lever 95 mounted by a vertical pivot pin 96 between the plates 75'—75"; the other arm of the bell crank having pivoted connection at its end, by means of a pivot pin 97 with the clamp jaw 77 as shown in FIG. 11.

Thus, it will be understood that to set the clamp jaws against the skyline cable 10 to hold the skycar against travel on the cable, air under pressure is admitted to the proper ends of the air cylinders 90, to cause the resultant movement of the bell cranks 95 to move the jaws 77 toward the opposedly related jaws 76 to clamp the skyline cable 10 between them; the tightening of the jaws against the cable is further induced by that endwise movement of the closed jaws with the cable under the tendency of the skycar to move down the cable by self energized action under force of gravity. Release of the jaws is effected by application of air to the cylinders 90 to move the pistons in such direction as to effect separation of the coacting jaws. When it is desired to open the jaws 76—77 apart, beyond the normal distance required to release their holding grip on the skyline 10, the cross-shaft 82 is actuated upwardly to free it from the shoulders 81 of the lever arms 78—78'; this being effected by means shown in FIG. 11 through the actuation of a bell crank lever 98 which is mounted by a horizontal shaft 98' extended between the jaw 76 supporting arms 78—78' with one arm of said bell crank operatively connected by a link 98a with the cross-shaft 82 and its other arm operatively connected to the piston rod 99' of an air cylinder 99 that is pivoted in the frame structure of the clamp, as at 92'.

The arrangement of parts as above described, is such that when air under pressure is delivered to the pivoted end of the cylinder 99, the bell crank 98 will be activated to cause the release of shaft 82 from the shoulders 81 and allow the jaws to open apart for free running of the cable 10 between them.

Figure 12:
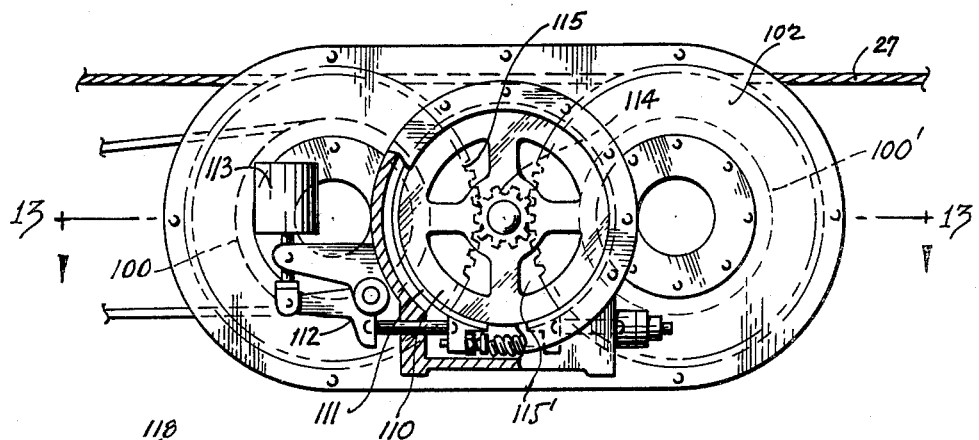
FIG. 12 is a side view of the slack puller as applied in the skycar.
Figure 13:
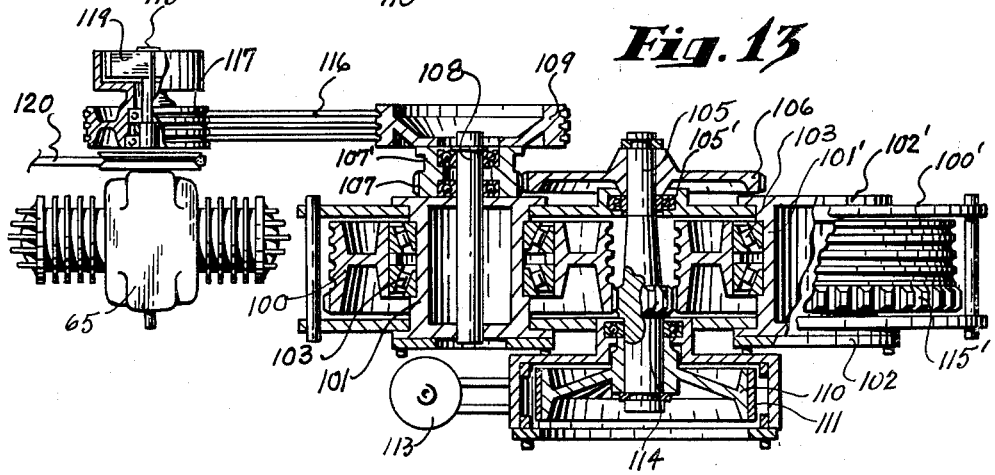
FIG. 13 is a horizontal section taken on line 13—13 in FIG. 12.
Figure 14:
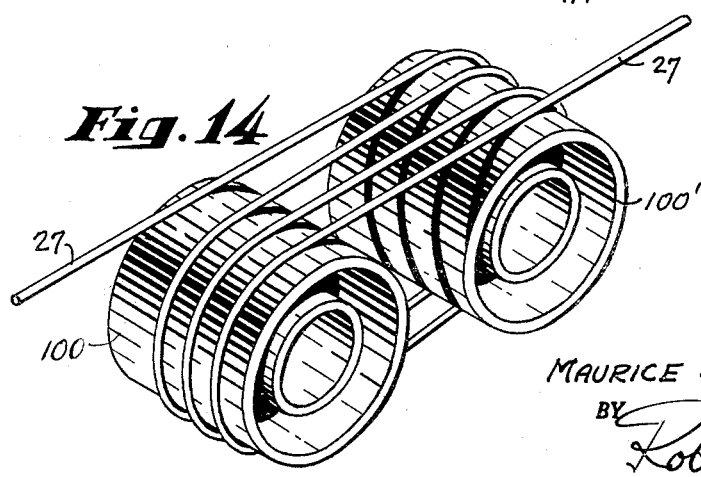
FIG. 14 is a schematic showing, in perspective, of the cable winding drum arrangement of the slack puller.

The slack puller 30 is shown in FIGS. 12, 13 and 14 to comprise a pair of cable winding drums 100—100' of equal diameters, mounted for rotation on drum type axles 101—101' supported horizontally in parallel relationship in a substantial frame structure that is rigidly fixed in the carriage 25 and which frame comprises opposite side plates 102—102', as shown in FIG. 13; the drums being rotatably mounted on the axles 101—101' through the mediacy of suitable anti-friction bearings 103.

Extended horizontally between the drums 100—100' and revolubly supported in the frame structure of the carriage by bearings 105' is a cross-shaft 105 which at one end has a gear wheel 106 keyed thereon in operative mesh with a smaller gear wheel 107 formed on a cylindrical hub 107' rotatably mounted on a shaft 108 extending coaxially of hub 101. Hub 107' has a driving belt wheel 109 fixed thereto and through which the drums may be driven, as presently will be more fully explained.

Fixed on that end of cross-shaft 105 that is opposite gear 106, is a brake drum 110 fitted with a brake band 111 that may be tightened or released through a conventional mechanism shown at 112 in FIG. 12, by action of an air cylinder 113. Also formed on the cross-shaft 105 is a pinion gear wheel 114 which meshes with gear teeth bands 115—115' formed about the drums 100 and 100' so that these drums will be rotated in unison in the same direction as shaft 105. The drums 100—100' are adapted to be driven through shaft 105 by the V-belts 116 operating about belt wheel 109 and about a driving belt wheel 117 fixed on the drive shaft 118 of engine 65, as seen in FIG. 13.

It is shown in FIG. 13 that the belt wheel 117 is driven by engine 65 through a centrifugal clutch 119 and it will here be further explained that the engine 65 is running at all times, but the clutch is effective only at accelerated speeds and is ineffective at idling speeds. Therefore, when it is desired to energize the slack puller drums, the engine 65 is accelerated to cause the belt driving wheel 117 to become effective.

Engine 65 also operates through suitable belting shown at 120 in FIG. 7 to drive the compressor 70 which supplies the tank 70' with air under pressure for application to the air operated cylinders of the cable clamp and slack puller.

The snubber cable 27 enters the skycar at one end between the fairleader 67 and is wound about the two drums 100 and 100' as shown schematically in FIG. 14 and then passes from the skycar at its other end over sheave wheel 68'. Preferably, the drums are channeled as indicated in FIG. 13, for seating the cable wrappings therein, thus to better hold them against slippage or tangling.

The drums 100—100' may be held against rotation by setting the brake band 111 about drum 110. When the brake is released, the drums will run free in unison during the winding in of the snubber line 27 by the drum 28 on the loader 17.

Figure 16:
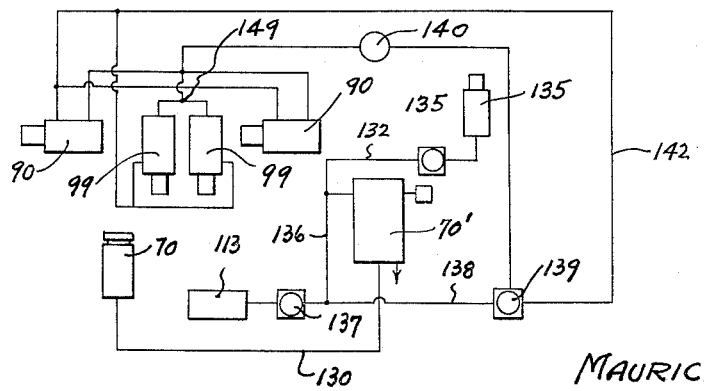
FIG. 16 is a diagram schematically showing the air line and control system in the skycar.

It is shown in FIG. 16 that the air compressor 70 delivers air under pressure through pipe line 130 to air storage tank 70' and from this tank pipe line connections 132 are made with a throttle control cylinder or engine 65 through a solenoid valve control 137 to the brake actuating cylinder 113. Likewise, a pipe line 138 connects the air storage tank 70', through solenoid valve 139 and a quick release valve 140 with the air cylinders 99 and 99 for cable clamp jaw release. Also, a pipe line 142 leads from valve 139 to the cable clamp cylinders 90—90; it being noted that the pipe line leading from valve 139 through valve 140 serves both air cylinders 90—90 and 99—99, by reason of the connection indicated at 149.

Figure 15:
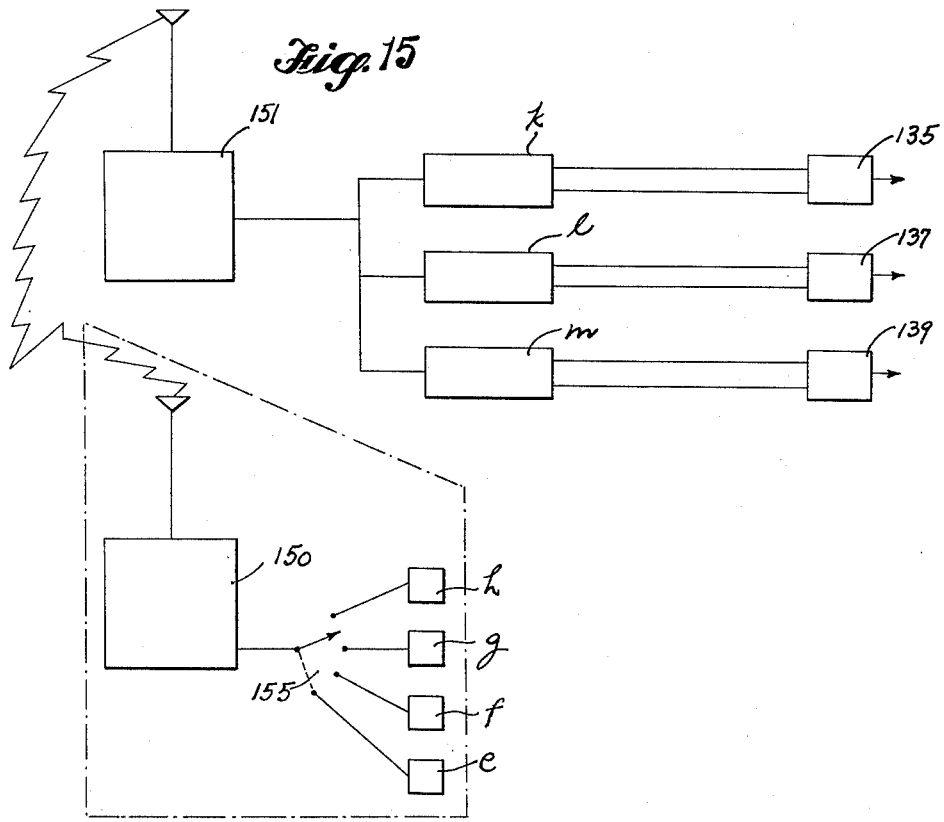
FIG. 15 is a schematic diagram of the radio controlled system.

The solenoid valves 135, 137 and 139 of the air system shown in FIG. 16 are controlled by radio impulses transmitted by a worker on the ground; this radio control system being schematically shown in FIG. 15 wherein the transmitter is designated at 150 and the receiver, located in the skycar, is designated at 151. In connection with the transmitter are tone or signal modulators $e$, $f$, $g$ and $h$ that may be selectively energized by switch means shown at 155. In connection with the receiver are decoders $k$, $l$ and $m$, which, respectively, operate to control the solenoid valves for clamp, brake, and engine throttle operation; it being understood that the decoders operate to close relay contacts when proper tone is received.

With the various parts of the system so assembled and installed as in FIG. 1, a down hill logging operation is carried on as follows: Assuming, for example, that the skycar is located adjacent the loader 17, and that the snubber cable 27, as applied to the slack puller drums in FIG. 14 has been wound in on its drum 28 to desired extent, and the slack puller brake has been set; the snubber cable 27 is first payed out from and under control of its winding drum 28 to allow the skycar to travel down the skyline 10 to the selected logging position. The cable clamp 31 is then set against the skyline 10 by radio transmission, to hold the skycar against any travel thereon. The slack puller brake is then released by radio, and the slack puller drums set in rotation by the acceleration of the continuously running engine 65, thus to forcibly pay out that end portion of the snubber line from the skycar. Then, a ground worker herein referred to as the "hooker," carries the end of the snubber out line from the skycar to the extent necessary and makes the proper connection with the log load to be hauled in. With this connection made and engine 65 then idling, the snubber line is wound in by the drum located on the loader, and in this way the log load is brought to a suspended position below the skycar. The released slack puller brake is then set to hold its drums and the snubber line, and the cable clamp 31 is released. The skycar is then pulled up the skyline to the landing point by winding in the snubber cable on its winding drum. When the skycar reaches the landing, the cable clamp 31 is again set to hold the skycar in position, the slack puller brake is released, and the load may be lowered to the ground for pick up by the loading boom in the usual manner if this is desired. Substantially the same procedure is followed if the usual donkey engine is employed in place of the loader 17. The order in which the various operations takes place is governed to some extent by conditions and places of use.

What I claim as new is:

1. A cable logging system comprising a skyline cable, a carriage mounted for travel on said skyline cable, a stationary power means, a cable drum interconnected with said power means, a carriage moving and lifting cable wound on and extending from said cable drum to and through said carriage, clamp means on said carriage selectively engageable with said skyline cable to hold said carriage at any desired position along said skyline cable, power means in said carriage, a slack puller interconnected with said power means, remote control means for actuating said power means in said carriage, said carriage moving and lifting cable being wound about said slack puller and having a free end depending downwardly therefrom and brake means associated with the slack puller to selectively lock the slack puller and thereby retain the carriage moving and lifting cable in fixed relationship therewith.

2. A cable logging system as recited in claim 1 wherein said remote control means is a radio frequency receiver in the carriage.

3. A cable logging system as recited in claim 1 wherein said brake means is radio controlled.

4. A cable logging system as in claim 1 wherein said slack puller includes a pair of spaced parallel cable drums and said drums are driven by the power means in the carriage only in one direction to pay out said lifting cable and said drums are caused to rotate in the opposite direction incident to the hauling in of the lifting cable by said stationary power means.

5. A cable logging system as in claim 1 wherein said power means in the carriage is a gas engine which is constantly running when the carriage is in use and a clutch is included which provides a driving connection with the slack puller incident to the acceleration of the engine.

6. In a cable logging system as in claim 1 wherein said clamp means on the carriage comprises coacting jaws and a power operated means for adjusting said jaws apart for free passing of the cable between them and to adjust them to clamp and hold the cable between them to prevent travel of the carriage, said power operated means including a bell crank lever pivoted between its ends on said carriage and connected at one end with one of said jaws and connected at its opposite end with a power cylinder whereby said bell crank may be selectively rocked in opposite directions to effect the cable releasing or holding action of said coacting jaws.

7. A cable logging system as in claim 6 wherein said power means for adjusting said jaws is remotely controlled through a radio frequency receiver.

References Cited in the file of this patent

UNITED STATES PATENTS

| | | |
|---|---|---|
| 2,359,073 | Allard | Sept. 26, 1944 |
| 2,529,804 | Harnischfeger et al. | Nov. 14, 1950 |
| 2,790,561 | Wyssen | Apr. 30, 1957 |